United States Patent
Huxol et al.

(10) Patent No.: US 10,293,437 B2
(45) Date of Patent: May 21, 2019

(54) METHOD OF WORKING A GAS TURBINE ENGINE AIRFOIL

(71) Applicant: UNITED TECHNOLOGIES CORPORATION, Farmington, CT (US)

(72) Inventors: Jason Eric Huxol, Mansfield, TX (US); Hector Martinez, San Antonio, TX (US); Mark Towner, Pettus, TX (US); Jose M. Quinones, San Antonio, TX (US); Michael Everett, San Antonio, TX (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 481 days.

(21) Appl. No.: 13/651,190

(22) Filed: Oct. 12, 2012

(65) Prior Publication Data

US 2014/0101938 A1    Apr. 17, 2014

(51) Int. Cl.
| | |
|---|---|
| B23H 1/00 | (2006.01) |
| B23H 9/10 | (2006.01) |
| B23P 6/00 | (2006.01) |
| C21D 1/42 | (2006.01) |
| B23K 31/00 | (2006.01) |
| F01D 5/00 | (2006.01) |
| C21D 9/50 | (2006.01) |
| B23H 9/00 | (2006.01) |
| F01D 5/18 | (2006.01) |

(52) U.S. Cl.
CPC .............. *B23K 31/00* (2013.01); *B23H 9/001* (2013.01); *B23H 9/10* (2013.01); *B23P 6/007* (2013.01); *C21D 9/50* (2013.01); *F01D 5/005* (2013.01); *F01D 5/186* (2013.01); *B23H 1/00* (2013.01); *C21D 1/42* (2013.01); *C21D 9/505* (2013.01); *C21D 2221/00* (2013.01); *F05D 2230/80* (2013.01); *Y02P 10/253* (2015.11); *Y10T 29/49316* (2015.01)

(58) Field of Classification Search
CPC .... B23P 6/02; B23P 6/04; B23P 6/045; B23P 6/005; B23P 6/07; B23K 3/04; B23K 3/0475; B23K 2201/01; B23K 2203/02; B23K 2203/14; B23K 2203/24; C21D 9/50; C21D 9/505; F01D 5/005
See application file for complete search history.

(56) References Cited

U.S. PATENT DOCUMENTS

| | | | |
|---|---|---|---|
| 5,606,796 A | | 3/1997 | Fraser |
| 5,897,801 A | * | 4/1999 | Smashey .............. B23K 9/0026 148/524 |
| 5,914,059 A | * | 6/1999 | Marcin et al. ........... 219/121.66 |
| 6,159,314 A | * | 12/2000 | Koizumi et al. .............. 148/555 |

(Continued)

*Primary Examiner* — David P Bryant
*Assistant Examiner* — Lee A Holly
(74) *Attorney, Agent, or Firm* — Cantor Colburn LLP

(57) ABSTRACT

A method of working a gas turbine engine component, for example, a turbine airfoil platform having a heat crack, is disclosed. The presented method may allow turbine airfoils to be repaired, modified, manufactured or otherwise worked and subsequently assembled into a turbine section of a gas turbine engine. This method may help to reduce the costs of operating a gas turbine engine by allowing damaged turbine airfoils to be repaired rather than discarded.

20 Claims, 4 Drawing Sheets

(56) References Cited

U.S. PATENT DOCUMENTS

| | | | |
|---|---|---|---|
| 6,333,484 B1* | 12/2001 | Foster et al. | 219/121.64 |
| 6,996,906 B2 | 2/2006 | Bowden, Jr. et al. | |
| 8,561,298 B2* | 10/2013 | Morin et al. | 29/889.21 |
| 2005/0274008 A1* | 12/2005 | Wayte | B23P 6/007 |
| | | | 29/889.1 |
| 2007/0267109 A1* | 11/2007 | Kelly et al. | 148/516 |
| 2008/0028605 A1* | 2/2008 | Lutz | B23K 9/0026 |
| | | | 29/889.1 |
| 2011/0108535 A1* | 5/2011 | Kawaguchi et al. | 219/121.84 |
| 2012/0084980 A1* | 4/2012 | Miglietti | B23K 35/007 |
| | | | 29/889.1 |
| 2013/0019473 A1* | 1/2013 | DeMichael et al. | 29/888.021 |
| 2013/0326877 A1* | 12/2013 | Rose | 29/889.1 |
| 2014/0042128 A1* | 2/2014 | Feng et al. | 219/69.17 |

\* cited by examiner

METHOD OF WORKING A GAS TURBINE ENGINE AIRFOIL

FIELD OF THE DISCLOSURE

The present disclosure generally relates to gas turbine engine airfoils and, more specifically, to methods for repairing turbine airfoils.

BACKGROUND OF THE DISCLOSURE

A gas turbine engine operates by drawing in ambient air, combusting that air with a fuel, and then forcing the exhaust from the combustion process out of the engine. A compressor, with a plurality of airfoils, rotates to draw in and compress the ambient air. The compressed air is then forced into the combustor, where a portion of the air is used to cool the combustor, while the rest is mixed with a fuel and ignited.

Typically, an igniter generates an electrical spark to ignite the air-fuel mixture. The products of the combustion then travel out of the combustor as exhaust through a turbine. The turbine typically has a plurality of rotor airfoils extending from a center body and a plurality of stator airfoils extending to the center body from an engine case surrounding the turbine. As the exhaust expands through the turbine airfoils and stators the turbine and turbine airfoils are forced to rotate around an engine shaft. The turbine and the compressor are connected by a common shaft, which runs through the center of the engine, or in the case of dual spool engines, first and second concentrically mounted shafts. Thus, as the turbine rotates from the exhaust, the associated compressor rotates to bring in and compress new air. Once started, it can thereby be seen that this process is self-sustaining. In industrial gas turbine engines, a power turbine, which rotates freely with respect to the other turbine and the compressor, is rotated by the exhaust to generate an output power.

The turbine must be constructed to endure tremendously high temperatures since the exhaust exiting the combustor is very hot. Therefore, a plurality of cooling holes are typically provided in the turbine to allow a portion of the compressed air from the compressor to flow to the turbine airfoils and act as cooling air to cool the airfoils.

While effective, newer combustor designs generate even higher temperatures in the combustor and therefore produce higher temperature exhaust. Moreover, uneven burning in the combustor, uneven air or fuel spread, or the like may increase the temperature of the already high temperature exhaust to create pockets of very high temperature exhaust leaving the combustor. This increased temperature may occasionally cause heat stress cracks to form on a platform of the turbine airfoils. Additionally, the turbine airfoils cycle between atmospheric and very hot temperatures and back again during every start-up and shut-down of the engine. Over long periods of use, the turbine airfoils may develop heat stress cracks for this reason as well. In such situations, the entire turbine airfoil affected is typically discarded and replaced. As each turbine airfoil is very expensive, this practice results in increased cost to the engine operator.

Therefore, it can be seen that a need exists for a method of repairing turbine airfoils. Specifically, a method of repairing the platform of a turbine airfoil is needed.

SUMMARY OF THE DISCLOSURE

In accordance with one aspect of the disclosure, a method of working a gas turbine engine component is disclosed. The method may include heat treating the gas turbine engine component fully a first time, which may further include heating the gas turbine engine component and subsequently cooling the gas turbine engine component. The method may further include removing an area of the gas turbine engine component and heat treating the gas turbine engine component locally a first time. The first local heat treatment may include heating the gas turbine engine component in the vicinity of the removed area and subsequently cooling the gas turbine engine component. A filling material may be welded to replace the removed area and then the gas turbine engine component may be locally heat treated a second time. The second local heat treatment may include heating the weld and the gas turbine engine component in the vicinity of the weld and subsequently cooling the gas turbine engine component. The gas turbine engine component may be heat treated fully for a second time, which may include heating the gas turbine engine component and subsequently cooling the gas turbine engine component.

In a refinement, the method may further include placing the gas turbine engine component in an inert gas purge box before welding.

In another refinement, the method may further include heating the gas turbine component blade to about 2050 degrees Fahrenheit for about four hours during full heat treating.

In another refinement, the method may further include heating the gas turbine engine component to about 2175 degrees Fahrenheit for about four hours during full heat treating.

In another refinement, the method may further include cooling the gas turbine engine component by between two and five degrees Fahrenheit per minute during the first full heat treating.

In another refinement, the method may further include cooling the gas turbine component blade to about 1700 degrees Fahrenheit during the first full heat treating.

In yet another refinement, the removing is performed by electrical discharge machining an area to remove the area.

In yet another refinement, the method may further include heating the gas turbine engine component to about 1900 degrees Fahrenheit during the first local heat treating.

In yet another refinement, the method may further include cooling the gas turbine engine component to about 1500 degrees Fahrenheit during the first local heat treating.

In yet another refinement, the method may further include heating the gas turbine engine component with a quartz lamp during local heat treating.

In still yet another refinement, the method may further include heating the gas turbine engine component with an induction coil during local heat treating.

In still yet another refinement, the method may further include heating the gas turbine engine component to about 2000 degrees Fahrenheit during the second local heat treating.

In still yet another refinement, the method may further include cooling the gas turbine engine component to room temperature during the second local heat treating.

In still yet another refinement, the heat treating the gas turbine engine component fully may involve heat treating fully a turbine airfoil of a gas turbine engine.

In a further refinement, the removing an area may involve removing a damaged area of a platform of the turbine airfoil.

In another aspect of the present disclosure, a method of repairing a gas turbine engine airfoil is disclosed. The method may include heat treating the gas turbine engine airfoil fully a first time. The first full heat treatment may include heating the gas turbine engine airfoil to between 2050 and 2175 degrees Fahrenheit and subsequently cooling the gas turbine engine airfoil. The method may further include removing an area of the gas turbine engine airfoil. The area around the removed area may be locally heat treated, which may include heating the area around the removed area to a temp of about 1900 degrees Fahrenheit and subsequently cooling the area around the removed area. A weld may be created by welding a filling alloy onto the gas turbine engine airfoil to replace the removed area. The weld and an area around the weld may then be locally heat treated. This local heat treatment may include heating the weld and the area around the weld to a temperature of about 2000 degrees Fahrenheit and subsequently cooling the weld and the area around the weld to room temperature. The gas turbine engine airfoil may be fully heat treated a second time, including heating the gas turbine engine airfoil to a temperature between 2050 and 2175 degrees Fahrenheit and subsequently quick cooling the gas turbine engine airfoil.

In a refinement, the heat treating of the area around the removed area, the area around the weld, and the weld may be performed with a heat lamp.

In another refinement, the heat treating of the area around the removed area, the area around the weld, and the weld may be performed with an induction coil.

In another refinement, the full heat treating may be performed for about four hours.

In accordance with yet another aspect of the disclosure, a method of repairing a turbine airfoil of a gas turbine engine is disclosed. The method may include heat treating the gas turbine engine airfoil fully a first time, which may further include heating the turbine airfoil to a temperature between about 2050 and 2175 degrees Fahrenheit for a period of about four hours and subsequently cooling the turbine airfoil at a rate of about two to five degrees Fahrenheit per minute. The method may further include removing a damaged area of the turbine airfoil to create a cavity and locally heat treating the turbine airfoil in the vicinity of the cavity. The local heat treatment may include heating the turbine airfoil in the vicinity of the cavity to a temperature of about 1900 degrees Fahrenheit and subsequently cooling the area. A weld may be created by a filler alloy being welded into the cavity and then the turbine airfoil may be locally heat treated at the weld and the area around the weld. This local heat treatment may include heating the weld and area around the weld to a temperature of about 2000 degrees Fahrenheit and subsequently cooling the weld and area to room temperature. The turbine airfoil may then be heat treated fully for a second time, which may include heating the turbine airfoil to a temperature to between about 2050 and 2175 degrees Fahrenheit and subsequently cooling the turbine airfoil.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
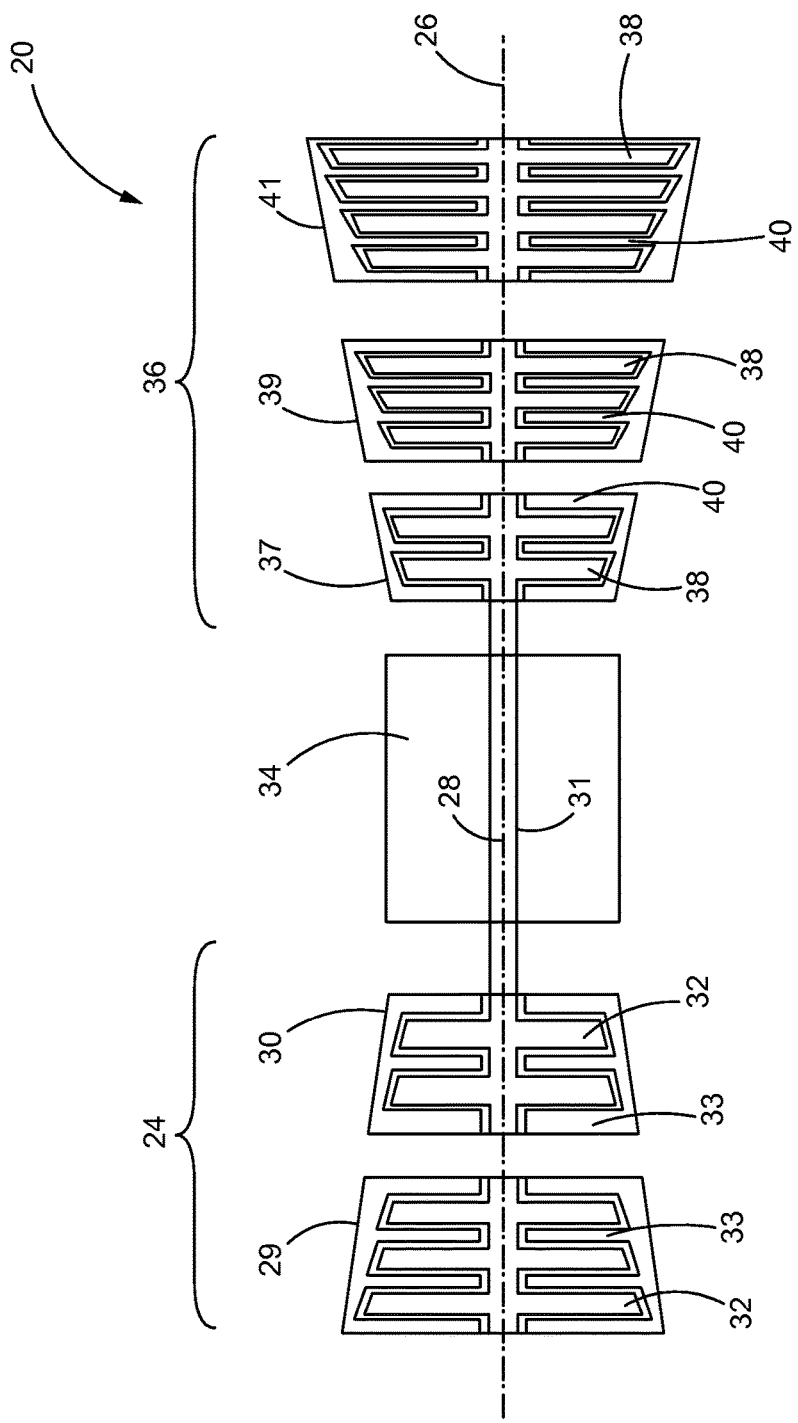
FIG. 1 is a sectional view of an industrial gas turbine engine built in accordance with the teachings of the present disclosure.

Referring now to the drawings, and with specific reference to FIG. 1, a gas turbine engine, depicted as, but not limited to, an industrial gas turbine engine, is disclosed and generally referred to by numeral 20. The engine 20 includes a plurality of axially aligned components beginning with a compressor section 24. Ambient air enters the engine through the compressor section 24 which rotates around a central axis 26 on a first shaft 28 and a second shaft 31, which extends through the engine 20 along the central axis 26. The compressor section 24 pictured is a dual spool compressor having a low-pressure compressor section 29 mounted to the first shaft 28 and a high-pressure compressor section 30 mounted to the second shaft 31 that is concentrically mounted around the first shaft 28. Each of the low-pressure compressor section 29 and high-pressure compressor section 30 includes a plurality of rotor airfoils 32 and stator airfoils 33.

The compressor section 29 compresses ambient air by rotating on the shaft 28 around the central axis 26, and then diverts the compressed air to the high-pressure compressor section 30 where the air is further compressed. After exiting the high-pressure compressor section 30, the compressed air flows into a combustor 34 where the compressed air is split to be used as combustion air and cooling air. Combusting the combustion air with a fuel in the combustor 34 creates an exhaust, which exits the combustor 34 and expands into the turbine section 36. The turbine section 36 is also dual spooled, having a high-pressure turbine 37 and a low-pressure turbine 39, with each section including a plurality of rotor airfoils 38 and stator airfoils 40. The expanding exhaust causes the rotor airfoils 38 to rotate around the central axis 26 between the stator airfoils 40 and thereby drives the rotation of the corresponding compressor section 29 and 30. Thus, new air is drawn into the engine 20 as the exhaust exits the engine 20. Additionally a power turbine 41 is mounted axially behind the low-pressure turbine 39 and is free to rotate separate from the high and low pressure turbines 37 and 39 to generate power.

Figure 2:
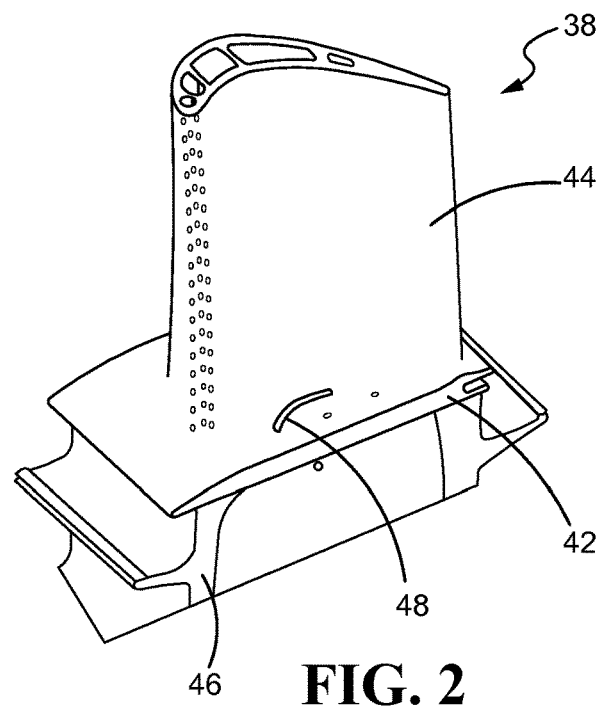
FIG. 2 is a perspective view of an exemplary turbine airfoil having a crack in a platform and needing repair.

As can be seen in FIG. 2, each of the turbine airfoils 38 may have a platform 42 from which a turbine blade 44 radially extends. The exhaust leaving the combustor 34 impinges on each turbine blade 44 to cause the turbine airfoils 38 to rotate around the central axis 26. Each of the stator airfoils 40 may be positioned to re-align the exhaust to impinge on the next set of rotor airfoils 38 and move in an axial direction out of the engine 20. Each of the rotor airfoils 38 may further include a root 46 which may balance the rotor airfoil 38 and retain the rotor airfoil 38 in the engine 20 while rotating at the high speeds generated by the engine 20.

During operation, the hot exhaust leaving the combustor 34 may stress the turbine rotor airfoils 38 and turbine stator airfoils 40. Specifically, a platform 42 of the rotor airfoil 38 may become stressed or otherwise damaged by the high temperatures. For example, the damage may be in the foam of a crack 48 through the platform 42 as depicted in FIG. 2. However, other forms of stress induced damage are possible. Once such a crack or other form of damage appears, prior art methods have required the entire turbine airfoil 38 to be discarded at significant expense to the engine operator.

The present disclosure significantly deviates from this approach, however, by providing a method of which such airfoils can be welded and returned to service. By way of background, typical turbine airfoils are manufactured from super-alloys employing nickel, cobalt or nickel-iron, such as Haynes alloys, Rene alloys, Haste alloy, Incoloy, and the like. Such super-alloys exhibit excellent mechanical strength and resistance to creep at high temperatures.

While effective, repair for such airfoils has been heretofore impossible. The inventors have therefore developed a repair method that enables repair, as opposed to wholesale discards, of such airfoils. The method of the present disclosure capitalizes on the gamma prime phase of such super-alloys. The inventors have found that the strength of the airfoils 38 increases as the gamma prime phases grow. High temperatures, such as those of the engine exhaust, cause these gamma prime phases to grow during operation of the engine 20 giving the airfoils 38 very high strength. At about 1100 degrees Fahrenheit, however, the gamma prime phases begin to weaken.

Therefore, before the airfoil 38 may be repaired, the inventors purposely overgrow these gamma prime phases by heating the airfoil 38 to over 1100 degrees Fahrenheit to increase the malleability of the airfoil 38 and ensure the airfoil 38 does not break during the repair process. Moreover, in doing so, other deleterious phases, which may cause the airfoil 38 to become brittle and that may form in the airfoil 38 during normal operation, may be removed as will be explained in further detail below.

As a first step, the airfoil 38 may be placed into a furnace and heated to between about 2050 degrees Fahrenheit and about 2175 degrees Fahrenheit and held at this temperature for an extended period of time such as, but not limited to, about four hours. In so doing, this may overgrow the gamma prime phase and remove other deleterious phases. The range of about 2050 degrees Fahrenheit to about 2175 degrees Fahrenheit is mentioned in that the inventors have found that heating the airfoil 38 to about 2050 degrees Fahrenheit may dissolve most of the deleterious phases, whereas heating the airfoil 38 to about 2175 degrees Fahrenheit may dissolve all of the deleterious phases. Higher temperatures will overgrow the gamma prime phases even more, and thus increase the malleability of the airfoil 38 even more, but may result in a less easily worked airfoil. Once the airfoil 38 has been heated, the airfoil 38 may then be cooled to about 1700 degrees Fahrenheit. The furnace may allow the airfoil 38 to cool at about two to five degrees Fahrenheit per minute, although other rates are possible. This slow cooling of the airfoil 38 may remove stresses and prepare the airfoil for repair.

Figure 4:
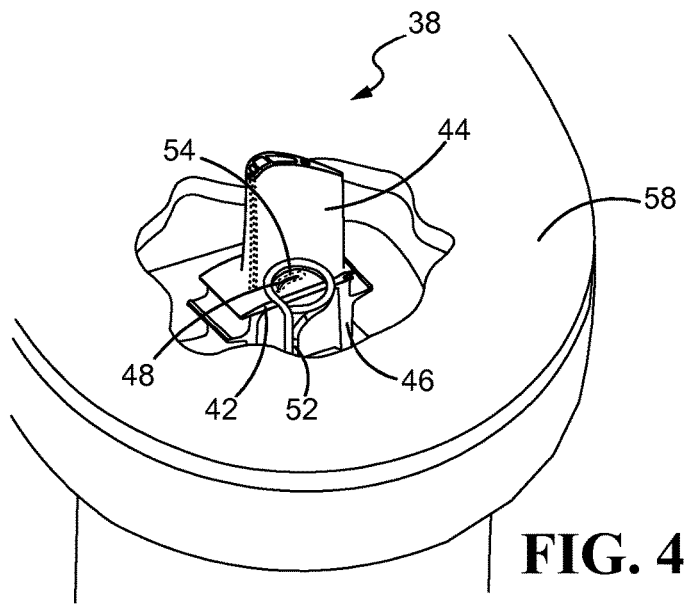
FIG. 4 is a perspective view of a turbine airfoil being heated through induction according to the teachings of the present disclosure.
Figure 5:
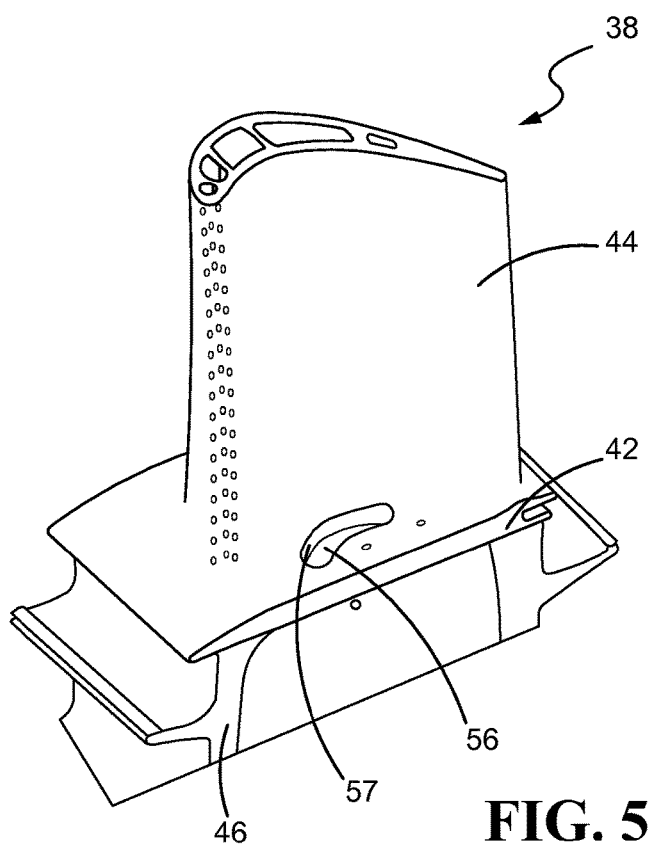
FIG. 5 is a perspective view of a turbine airfoil with a machined cavity according to the teachings of the present disclosure.

After such full heating and cooling, an area surrounding the crack 48, hereinafter referred to as a damaged area 54, may be removed. This may be done by a process of electrical discharge machining, which is a known process in the art and will not be further explained here. The crack 48 and the damaged area 54, detailed as a dashed line in FIGS. 3 and 4, may be completely machined away leaving a cavity 56 in the platform 42 as shown in FIG. 5. The crack 48 and damaged area 54 may be removed by other means known in the art, as well, and should not be limited to only the exemplary embodiment presented above. The platform 42 may be machined such that a smooth surface 57 defines the cavity 56 in the platform 42. The smooth surface 57 may allow for a better weld between a filling alloy and the platform 42 as will be described later herein.

At this point, the platform 42 may then be locally heat treated for a first time. As used herein, "locally" heat treating refers to heat treating specific portions of the airfoil 38, as opposed to "fully" heat treating, which as used herein, refers to heat treating the entire airfoil 38. This local heat treatment may include heating the platform 42, or other damaged portion, to about 1900 degrees Fahrenheit and subsequently cooling the platform 42 to about 1500 degrees Fahrenheit, although other temperatures are possible. This heat treatment may relieve any stress on the platform 42 which may have been incurred from removing the damaged area 54. The heating of the local heat treatment may be performed by a heat lamp 50 as in FIG. 3, such as a quartz lamp, or by induction, such as by an induction coil 52, as in FIG. 4.

Figure 3:
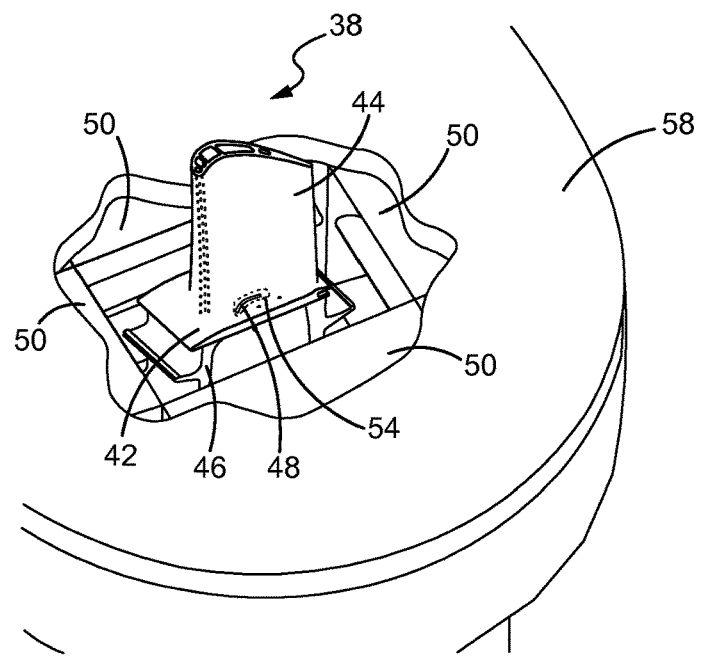
FIG. 3 is a perspective view of a turbine airfoil being heated by heat lamps according to the teachings of the present disclosure.

After such local heat treatment, the cavity 56 may then be filled with a filler alloy such as, but not limited to, Haynes® 282® or other nickel or cobalt super-alloys. The filler alloy may then be welded into the cavity 56. In one embodiment, the filler alloy may be welded by gas tungsten arc welding. To allow for the best possible weld, the airfoil 38 may be positioned inside an inert gas purge box 58 as depicted in FIGS. 3 and 4. The purge box 58 may create an inert environment around the airfoil 38 by flooding the area around the airfoil 38 with argon, which may allow for a stronger weld to be created. Another inert gas, other than argon, may also be used to create the inert environment around the airfoil 38 as well.

Once the filler alloy has been welded into the cavity 56, the platform 42 may be locally heat treated for a second time. During this heat treatment the platform may be heated to about 2000 degrees Fahrenheit for about fifteen minutes and subsequently cooled to room temperature. Other temperatures and durations are possible. The heating of the platform 42 from about 1000 to 1900 degrees Fahrenheit during this local heat treatment may be done quickly to avoid strain and cracking of the welded area. The platform 42 may be heated by the same equipment as during the first local heat treatment.

The airfoil 38 may then be placed into the furnace again to be fully heat treated for a second time. In this full heat treatment, the airfoil 38 may be heated to about 2175 degrees Fahrenheit for about four hours before being quick cooled, or quenched. Alternatively, if the airfoil 38 is heated to about 2050 degrees Fahrenheit during the first full heat treatment, then the airfoil 38 may also be heated to only 2050 degrees Fahrenheit during the second full heat treatment. This second full heat treatment may allow for controlled growth of the gamma prime phases in the airfoil 38, and relieve stress in the airfoil 38. Once the airfoil 38 has been allowed to cool, the airfoil 38 may be reassembled into the turbine section 36 of the engine 20.

Figure 6:
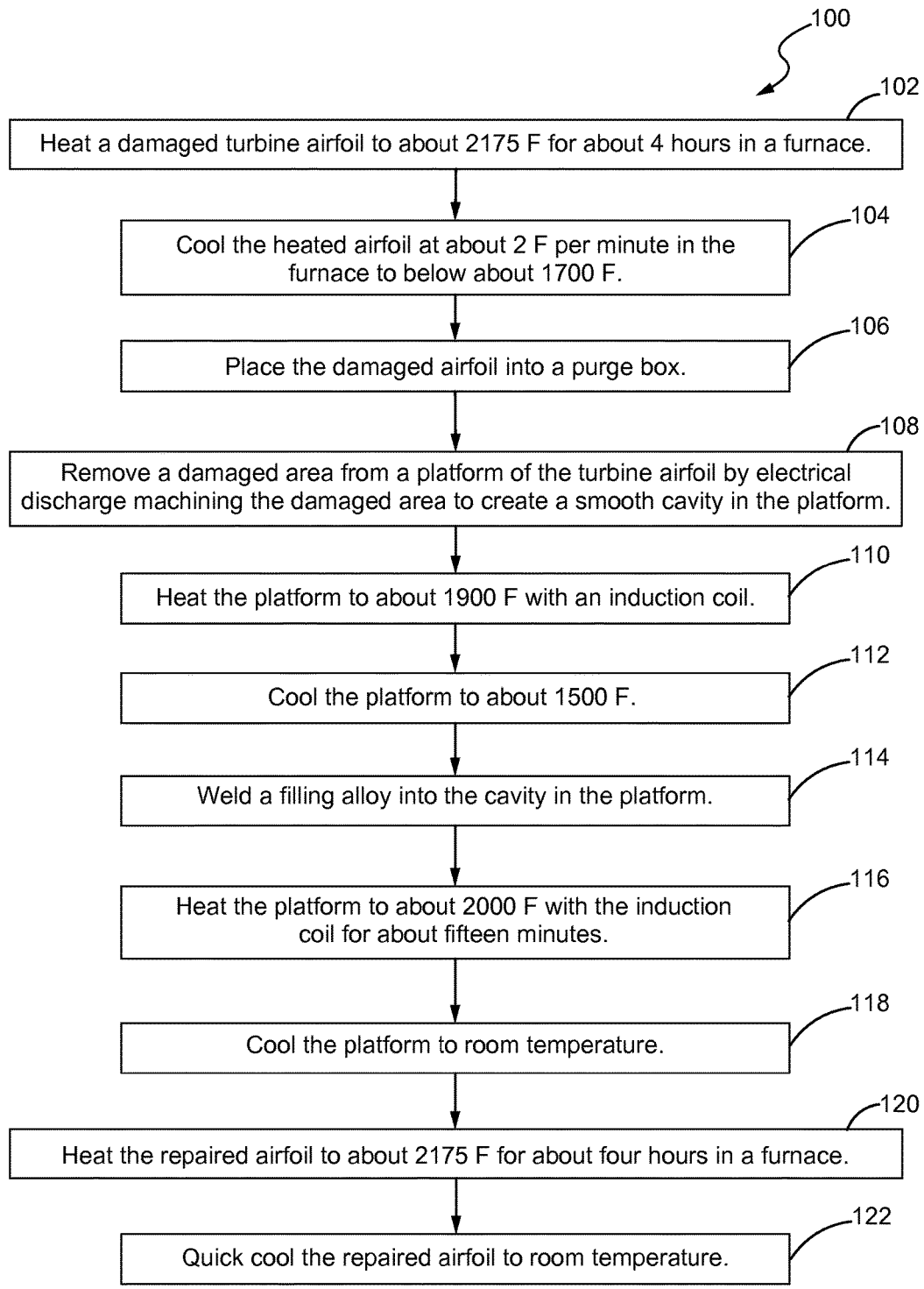
FIG. 6 is a flow chart depicting a sample sequence of steps which may be undertaken in accordance with the method of the present disclosure.

In operation, the turbine airfoil 38 having a platform 42 or other portion with the heat crack 48 or other damage may be repaired according to a method 100 depicted in FIG. 6. The method 100 of repairing the airfoil 38 may begin by fully heating the damaged blade 38 to between about 2050 to 2175 degrees Fahrenheit for about four hours by a furnace, for example as in step 102. In a step 104, the fully heated airfoil may then be cooled at about two to five degrees Fahrenheit per minute to below about 1700 degrees Fahrenheit, for example. The damaged airfoil 38 may next be placed into a purge box 58 filled with argon or another inert gas, as in a step 106. The damaged area 54 of the platform 42 of the airfoil 38 may then be removed by electrical discharge machining or the like to create the cavity 56 in the platform 42, as in a step 108. The platform 42 may then be locally heated, as in a step 110, to about 1900 degrees Fahrenheit by the heat lamp 50 or the induction coil 52 and then cooled to about 1500 degrees Fahrenheit, as in a step 112. A filling alloy may next be welded into the cavity 56 in the platform 42, such as in a step 114.

After welding, the platform 42 may be locally heated for a second time to about 2000 degrees Fahrenheit, this time for about fifteen minutes, as in a step 116. The platform 42 may then be cooled to room temperature, as seen in a step 118. The entire airfoil 38 may then be fully heated to between about 2050 to 2175 degrees Fahrenheit for about four hours by a furnace, as in step 120, before being quick cooled to room temperature in step 122.

INDUSTRIAL APPLICABILITY

From the foregoing, it can be seen that the technology disclosed herein has industrial applicability in a variety of settings such as, but not limited to working a gas turbine engine airfoil, specifically repairing a platform of the turbine airfoil. Repair of a damaged turbine airfoil may allow the turbine airfoil to continue operating in a gas turbine engine, which may reduce the long term costs associated with operating a gas turbine engine. Such costs may be reduced by repairing the turbine airfoil rather than discarding the airfoil once damage has been incurred.

While the present disclosure refers to repairing a damaged turbine airfoil, it is to be understood that the presented method of repair is also applicable to repairing, modifying, manufacturing, or otherwise working other engine components such as engine rotor airfoils, engine stator airfoils, and the like, such as those in the compressor or elsewhere. Additionally, it will be understood by one skilled in the art that while the above description refers to working a platform of a turbine airfoil, other elements of the turbine airfoil may be worked as well, such as, but not limited to, the well, such as, but not limited to, the turbine airfoil blade or the turbine airfoil root. It is therefore intended that the scope of the invention not be limited by the embodiments presented herein as the best mode for carrying out the invention, but that the invention will include all embodiments falling within the scope of the claims.

What is claimed is:

1. A method of repairing and reusing a gas turbine engine component previously manufactured from a super-alloy, comprising:

heat treating the previously manufactured gas turbine engine component as a whole fully a first time, including heating the previously manufactured gas turbine engine component in order to weaken the gamma prime phase of the super-alloy and subsequently cooling the gas turbine engine component in a first step;

removing a damaged portion from a damaged area of the gas turbine engine component in a second step after the first step;

heat treating only the damaged area a first time, including heating only the damaged area and subsequently cooling the damaged area in a third step after the second step;

welding a filling material to replace the removed damaged portion and create a weld in the damaged area in a fourth step after the third step;

heat treating only the damaged area a second time, including heating only the weld and the damaged area and subsequently cooling the weld and the damaged area in a fifth step after the fourth step; and heat treating the gas turbine engine component as a whole fully a second time, including heating the gas turbine engine component and subsequently quick cooling the gas turbine engine component directly to room temperature by quenching the gas turbine engine component in a sixth step after the fifth step.

2. The method of claim 1, wherein the heat treating the previously manufactured gas turbine engine component fully involves fully heat treating a turbine airfoil of the gas turbine engine.

3. The method of claim 2, wherein the removing a damaged portion involves removing the damaged portion from a platform of the previously manufactured turbine airfoil.

4. The method of claim 1, further comprising placing the previously manufactured gas turbine engine component in an inert gas purge box before welding.

5. The method of claim 1, further comprising heating the previously manufactured gas turbine engine component to about 2050 degrees Fahrenheit for about four hours during full heat treating.

6. The method of claim 1, further comprising heating the previously manufactured gas turbine engine component to about 2175 degrees Fahrenheit for about four hours during full heat treating.

7. The method of claim 1, further comprising cooling the previously manufactured gas turbine engine component by between two and five degrees Fahrenheit per minute during the first full heat treating.

8. The method of claim 1, further comprising subsequently cooling the previously manufactured gas turbine engine component to about 1700 degrees Fahrenheit after the first full heat treating.

9. The method of claim 1, wherein the removing is performed by electrical discharge machining the damaged area to remove the damaged portion.

10. The method of claim 1, further comprising heating the damaged area to about 1900 degrees Fahrenheit during the first heat treating of only the damaged area.

11. The method of claim 1, further comprising subsequently cooling the damaged area to about 1500 degrees Fahrenheit after the first heat treating of only the damaged area.

12. The method of claim 1, further comprising heating the damaged area with a quartz lamp during the heat treating of only the damaged area.

13. The method of claim 1, further comprising heating the damaged area with an induction coil during the heat treating of only the damaged area.

14. The method of claim 1, further comprising heating the damaged area to about 2000 degrees Fahrenheit during the second heat treating of only the damaged area.

15. The method of claim 1, further comprising subsequently cooling the damaged area to room temperature after the second heat treating of only the damaged area.

16. A method of repairing and reusing a gas turbine engine airfoil previously manufactured from a super-alloy and having a root and a platform, the method comprising:

heat treating the previously manufactured gas turbine engine airfoil as a whole fully a first time, including heating the previously manufactured gas turbine engine airfoil to a temperature between 2050 and 2175 degrees Fahrenheit in order to weaken the gamma prime phase of the super-alloy and subsequently cooling the gas turbine engine airfoil in a first step;

forming a cavity by removing a damaged portion from a damaged area of the platform in a second step after the first step;

heat treating only the platform a first time, including heating the cavity and the damaged area to a temperature of about 1900 degrees Fahrenheit and subsequently cooling the cavity and the damaged area in a third step after the second step;

creating a weld by welding a filling alloy to the gas turbine engine airfoil to fill the cavity in a fourth step after the third step;

heat treating only the platform a second time, including heating the weld and the damaged area to a temperature of about 2000 degrees Fahrenheit and subsequently cooling the weld and the damaged area to room temperature in a fifth step after the fourth step; and heat treating the gas turbine engine airfoil as a whole fully a second time, including heating the turbine airfoil to a temperature between about 2050 and 2175 degrees Fahrenheit and subsequently quick cooling the gas turbine engine airfoil directly to room temperature by quenching the gas turbine engine airfoil in a sixth step after the fifth step.

17. The method of claim 16, wherein the heat treating of only the platform is performed with a heat lamp.

18. The method of claim 16, wherein the heat treating of only the platform is performed with an induction coil.

19. The method of claim 16, wherein the full heat treating is performed for about four hours.

20. A method of repairing and reusing a turbine airfoil of a gas turbine engine, the turbine airfoil being previously manufactured from a super-alloy and having a platform and a root, the method comprising:

fully heat treating the previously manufactured turbine airfoil as a whole a first time, including heating the turbine airfoil to a temperature between about 2050 and 2175 degrees Fahrenheit for a period of about four hours in order to weaken the gamma prime phase of the super-alloy, and subsequently cooling the previously manufactured turbine airfoil at a rate of about two to five degrees Fahrenheit per minute in a first step;

electric discharge machining away a damaged portion from a damaged area of the platform to create a cavity in the damaged area in a second step after the first step;

heat treating only the platform a first time, including heating the damaged area to a temperature of about 1900 degrees Fahrenheit and subsequently cooling the damaged area in a third step after the second step;

welding a filler alloy into the cavity and thereby creating a weld in a fourth step after the third step;

heat treating only the platform a second time, including heating the weld and the damaged area to a temperature of about 2000 degrees Fahrenheit and subsequently cooling the weld and the damaged area to room temperature in a fifth step after the fourth step; and fully heat treating the previously manufactured turbine airfoil as a whole a second time, including heating the turbine airfoil to a temperature to between about 2050 to 2175 degrees Fahrenheit and subsequently quick cooling the previously manufactured turbine airfoil directly to room temperature by quenching the turbine airfoil in a sixth step after the fifth step.

* * * * *